US006952459B2

(12) United States Patent
Voyer

(10) Patent No.: US 6,952,459 B2
(45) Date of Patent: *Oct. 4, 2005

(54) METHOD OF OBTAINING A TRANSMISSION GAIN FUNCTION

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 682 days.

This patent is subject to a terminal disclaimer.

(21) Appl. No.: 09/981,980

(22) Filed: Oct. 19, 2001

(65) Prior Publication Data

US 2002/0105472 A1 Aug. 8, 2002

(30) Foreign Application Priority Data

Oct. 31, 2000 (FR) .............................. 00 14362

(51) Int. Cl.⁷ .............................. H04B 15/00; H04B 7/01
(52) U.S. Cl. ..................... 375/347; 455/70; 455/506; 455/101; 455/138; 455/562.1; 375/299; 375/349
(58) Field of Search .................. 455/69–70, 101, 455/103, 132, 138, 269, 500, 506, 562.1, 517, 522; 375/299, 347, 349

(56) References Cited

U.S. PATENT DOCUMENTS

| | | | | |
|---|---|---|---|---|
| 6,377,631 | B1 * | 4/2002 | Raleigh ...................... | 375/299 |
| 6,400,780 | B1 * | 6/2002 | Rashid-Farrokhi et al. . | 375/347 |
| 6,463,295 | B1 * | 10/2002 | Yun .......................... | 455/522 |
| 6,552,683 | B2 * | 4/2003 | Voyer ........................ | 342/378 |
| 6,615,024 | B1 * | 9/2003 | Boros et al. ............. | 455/67.14 |
| 6,665,545 | B1 * | 12/2003 | Raleigh et al. .......... | 455/562.1 |
| 6,694,155 | B1 * | 2/2004 | Chin et al. ............... | 455/562.1 |
| 6,754,473 | B1 * | 6/2004 | Choi et al. ................. | 455/101 |
| 2002/0048286 | A1 | 4/2002 | Brunel | |

FOREIGN PATENT DOCUMENTS

| | | |
|---|---|---|
| EP | 0 999 658 | 5/2000 |
| EP | 1 003 298 | 5/2000 |

OTHER PUBLICATIONS

T. Aste, et al., Annals of Telecommunications, Presses Polytechniques et Universitaires Romandes, vol. 53, No. 11/12, pp. 435–448, XP–000804147, "Downlink Beamforming for Cellular Mobile Communications (GSM System)", Nov., 1998.

J. Goldberg, et al., IEEE, vol. conf. 47, pp. 632–636, XP–000736684, "Downlink Beamforming for Cellular Mobile Communications", May 4–7, 1997.

* cited by examiner

Primary Examiner—Simon Nguyen
(74) Attorney, Agent, or Firm—Oblon, Spivak, McClelland, Maier & Neustadt, P.C.

(57) ABSTRACT

Method of obtaining a transmission gain function by means of an array of antennae, a signal to be transmitted by the array being weighted by a vector ($b_d$) of N complex coefficients, referred to as the transmission weighting vector, N being the number of antennae in the array, the array transmitting to a telecommunication terminal over a transmission channel, referred to as the downlink channel, a downlink transmission signal ($S_d$) and the said terminal transmitting to the said array over a transmission channel, referred to as the uplink channel, an uplink transmission signal ($S_u$), the said downlink channel being disturbed by an isotropic noise (N') and/or a directional noise, referred to as the downlink interference ($I_d$), the said transmission weighting vector ($b_d$) being determined by means of a matrix product from a noise power matrix ($D_d$) which is a function of the power of the said isotropic noise and/or of the power of the said directional noise and a vector ($\overline{C_d}$), referred to as the downlink channel vector, representing an angular sampling of the transfer function of the downlink channel in M directions k, k=0, . . . , M−1, belonging to the angular range covered by the array.

20 Claims, 4 Drawing Sheets

METHOD OF OBTAINING A TRANSMISSION GAIN FUNCTION

The present invention concerns in general terms a method of obtaining a transmission gain function. More particularly, the present invention relates to a method of obtaining an antenna gain in transmission mode for a base station in a mobile telecommunication system. It makes it possible to obtain an antenna gain function in transmission mode from an antenna gain function in reception mode.

The formation of channels or the elimination of interfering signals is well known in the field of narrow-band antenna processing. Each uses an array of antennae, generally linear and uniform (that is to say with a constant pitch) and a signal weighting module. More precisely, if it is wished to form a channel in reception mode, the signals received by the different antennae are weighted by a set of complex coefficients before being added. Conversely, if it is wished to form a channel in transmission mode, the signal to be transmitted is weighted by a set of complex coefficients and the signals thus obtained are transmitted by the different antennae.

FIG. 1 illustrates a known device for obtaining an antenna gain in transmission and reception. The device comprises an array of antennae $(10_0),(10_1), \ldots ,(10_{N-1})$, a transmission weighting module (11) and a reception weighting module (15). The signals received by the different antennae, $(x_i)$, $i=0 \ldots N-1$, are weighted at $(13_0),(13_1), \ldots ,(13_{N-1})$ by a set of complex coefficients $(b_{ui})$, $i=0, \ldots , N-1$ before being added at (14) in order to give a signal $R_u$. Conversely, a signal to be transmitted $S_d$ is weighted as $(12_0),(12_1) \ldots ,(12_{N-1})$ by a set of complex coefficients $(b_{di})$, $i=0, \ldots ,N-1$, before being transmitted by the different antennae.

If the vector of the received signals and the vector of the weighting coefficients are respectively denoted $\bar{x}=(x_0,x_1, \ldots ,x_{N-1})^T$ and $\bar{b}_u=(b_{u0},b_{u1}, \ldots ,b_{uN-1})^T$, it is possible to write:

$$R_u = \bar{b}_u^T \bar{x} \quad (1)$$

The complex gain (or the complex gain function of the antenna) in reception mode can be written:

$$G(\bar{b}_u, \theta) = \bar{b}_u^T \cdot \overline{e_{u\theta}} = \sum_{i=0}^{N-1} b_{ui} \cdot \exp(-j\varphi i) \quad (2)$$

where $\overline{e_{u\theta}}$ represents the vector $\bar{x}$ corresponding to a flat wave arriving at an angle of incidence $\theta$, and $$\varphi_i = (2\pi d/\lambda).i. \sin(\theta) = (2\pi df/c).i. \sin(\theta) \quad (3)$$

is the difference in operation between consecutive antennae for a uniform linear array with a pitch d, λ and f being respectively the wavelength and the frequency of the flat wave in question; and $$\varphi_i = 2\pi R\Delta\theta/\lambda. \sin(\theta-\theta_i) = 2\pi Rf\Delta\theta/c. \sin(\theta-\theta_i) \quad (4)$$

for a circular array where $\theta_i$ is the angle between a reference axis and the normal to the antenna of index i, R the radius of curvature of the array, $\Delta\theta$ is the angular difference between two consecutive antennae in the array.

Likewise, the complex gain (or the complex gain function) in transmission can be written:

$$G(\bar{b}_d, \theta) = \bar{b}_d^T \cdot \overline{e_{d\theta}} = \sum_{i=0}^{N-1} b_{di} \cdot \exp(j\varphi i) \quad (5)$$

with the same conventions as those adopted above and where $\overline{e_{d\theta}}$ represents the vector $\bar{x}$ corresponding to a flat wave transmitted in the direction $\theta$.

The weighting vectors in reception and transmission mode will be called respectively $\bar{b}_u$ and $\bar{b}_d$.

When the array of antennae is functioning in reception mode at a given frequency, different known methods, notably the Wiener filtering method, make it possible to determine the weighting vector $\bar{b}_u$ which maximises the signal to noise ratio. In a mobile telecommunications system, the array of antennae of a base station receives signals transmitted by a plurality of mobile terminals. In the context of a transmission in CDMA (Code Division Multiple Access) mode, the signals transmitted by the different mobile terminals are separated by means of the use of orthogonal codes on transmission and filters adapted to these codes on reception. In practice, however, the separation of the different signals received is not perfect. For an uplink between a given mobile terminal and the base station which serves it, the criterion to be maximised is then the ratio of signal to noise plus interference, the latter being due to the signals transmitted by the other mobile terminals. Likewise, the downlink between a base station and a given mobile terminal is disturbed not only by the background noise but by the interference due to the signals transmitted by the said base station to other mobile terminals. Though it is relatively easy to optimise the weighting vector in reception mode, $\bar{b}_u$, by estimating the uplink channel and the density of interference at the base station, it is quite different with regard to the optimisation of the weighting vector in transmission mode, $\bar{b}_d$. This is because the estimation of the downlink channel and the density of interference cannot be made directly at the base station and a transmission of this information by the mobile terminals is necessary. However, this transmission of information consumes conveyance resources on the uplink, which can be disadvantageous, notably in the case of rapid variations in the channel transfer function, for example when the mobile terminal is moving at high speed.

The aim of the invention is to propose a method of determining the transmission weighting vector, $\bar{b}_d$, optimising the ratio of signal to noise plus interference on the downlink and requiring the transmission only of a small quantity of information on the uplinks.

To this end, the invention is defined by a method of obtaining a gain function on transmission by means of an array of antennae, a signal to be transmitted by the network being weighted by a vector $(\bar{b}_d)$ of N complex coefficients, referred to as a transmission weighting vector, N being the number of antennae in the array, the array transmitting to a telecommunication terminal on a transmission channel, referred to as the downlink, a downlink transmission signal $(S_d)$, and the said terminal transmitting to the said network on a transmission channel, referred to as the uplink channel, an uplink transmission signal $(S_u)$, the said downlink channel being interfered with by an isotropic noise (N') and/or a directional noise, referred to as the downlink interference $(I_d)$, the said transmission weighting vector $(\bar{b}_d)$ being determined by means of a matrix product from a noise power matrix $(D_d)$ which is a function of the power of the said isotropic noise and/or the power of the said directional noise and a vector $(\bar{C}_d)$, the said downlink channel vector, representing an angular sampling of the transfer function of the downlink channel in M directions k, k=0, . . . ,M−1, belonging to the angular range covered by the array.

Advantageously, the said downlink channel vector ($\overline{C_d}$) is obtained from variations in the transfer function of the uplink channel. The said downlink channel vector ($\overline{C_d}$) is obtained for example from variations ($\overline{\Delta C_u}$) in a vector ($\overline{C_u}$), referred to as the uplink channel vector, representing an angular sampling of the transfer function of the uplink channel in the said M directions.

The variations ($\overline{\Delta C_d}$) in the downlink channel vector can be obtained from variations ($\overline{\Delta C_u}$) in the uplink channel.

The variations $\Delta c_{dk}$ in the components $c_{dk}$ of the downlink channel vector ($\overline{C_d}$) are advantageously obtained by means of variations $\Delta c_{uk}$ in the components $c_{uk}$ of the uplink vector by: $\Delta c_{dk}/c_{dk}=f_d/f_u \cdot \Delta c_{uk}/c_{uk}$ where $f_u$ is the frequency used on the said uplink channel and $f_d$ is the frequency used on the said downlink channel.

The said downlink channel vector ($\overline{C_d}$) is then obtained by integration of the said variations ($\overline{\Delta C_d}$) in the said downlink channel vector and an initial value ($\overline{C_d}(0)$) transmitted by the said terminal.

According to a first embodiment, the noise matrix is a diagonal matrix of size M×M and components $\sqrt{\sigma_{dk}^2 + \gamma_d N'_0/I_d}$ where $\sigma_{dk}^2$ is the downlink interference power in the direction k, $N'_0$ is the power of the isotropic noise, $\gamma_d=1/\|\overline{C_d}\|^2$ and $I_d$ is the total power of the downlink interference.

According to a second embodiment, the array transmitting on a plurality of downlink channels a plurality of transmission signals to a plurality of telecommunication terminals and receiving from them a plurality of transmission signals transmitted on a plurality of uplink channels, each downlink channel j relating to a terminal j of the said plurality being associated with a transmission weighting vector $\overline{b}_d(j)$, the second noise matrix relating to the downlink channel j is a diagonal matrix of size M×M and components $\sqrt{\sigma_{dk}^2(j)+\gamma_d(j) \cdot N'_0/I_d(j)}$ where $\sigma_{dk}^2(j)$ is the power of the downlink interference for the downlink channel j in the direction k, $\gamma_d(j)$ is a coefficient characterising the power transfer on the downlink channel j, $N'_0$ is the power of the second isotropic noise, and $I_d$ is the total power of the downlink interference.

Advantageously, the coefficient $\gamma_d(j)$ is transmitted to the array by the terminal j on the associated uplink channel.

Alternatively, the coefficient $\gamma_d(j)$ is estimated by the base station from a coefficient ($\Gamma$) characterising the power transfer in the uplink direction.

For a given downlink channel j, the downlink interference power in the direction k, $\sigma_{dk}^2(j)$, can be estimated according to the power of the signals ($S_d(j')$) transmitted on the downlink channels j' distinct from j, a coefficient $\beta_d(j)$ characterising the orthogonality of the downlink channel j, components $g_{dk}(j')$) of the gain vectors ($\overline{G}_d(j')$) relating to the said distinct downlink channels j', the gain vectors consisting of an angular sampling in the said M directions of the transmission gain functions obtained for the said distinct downlink channels j'.

Finally, the said coefficient $\beta_d(j)$ can be estimated from a coefficient characterising the orthogonality of the uplink channel j.

The invention is also defined by a device adapted to implement the method disclosed above.

The characteristics of the invention mentioned above, as well as others, will emerge more clearly from a reading of the following description given in relation to the accompanying figures, amongst which:

Figure 1:
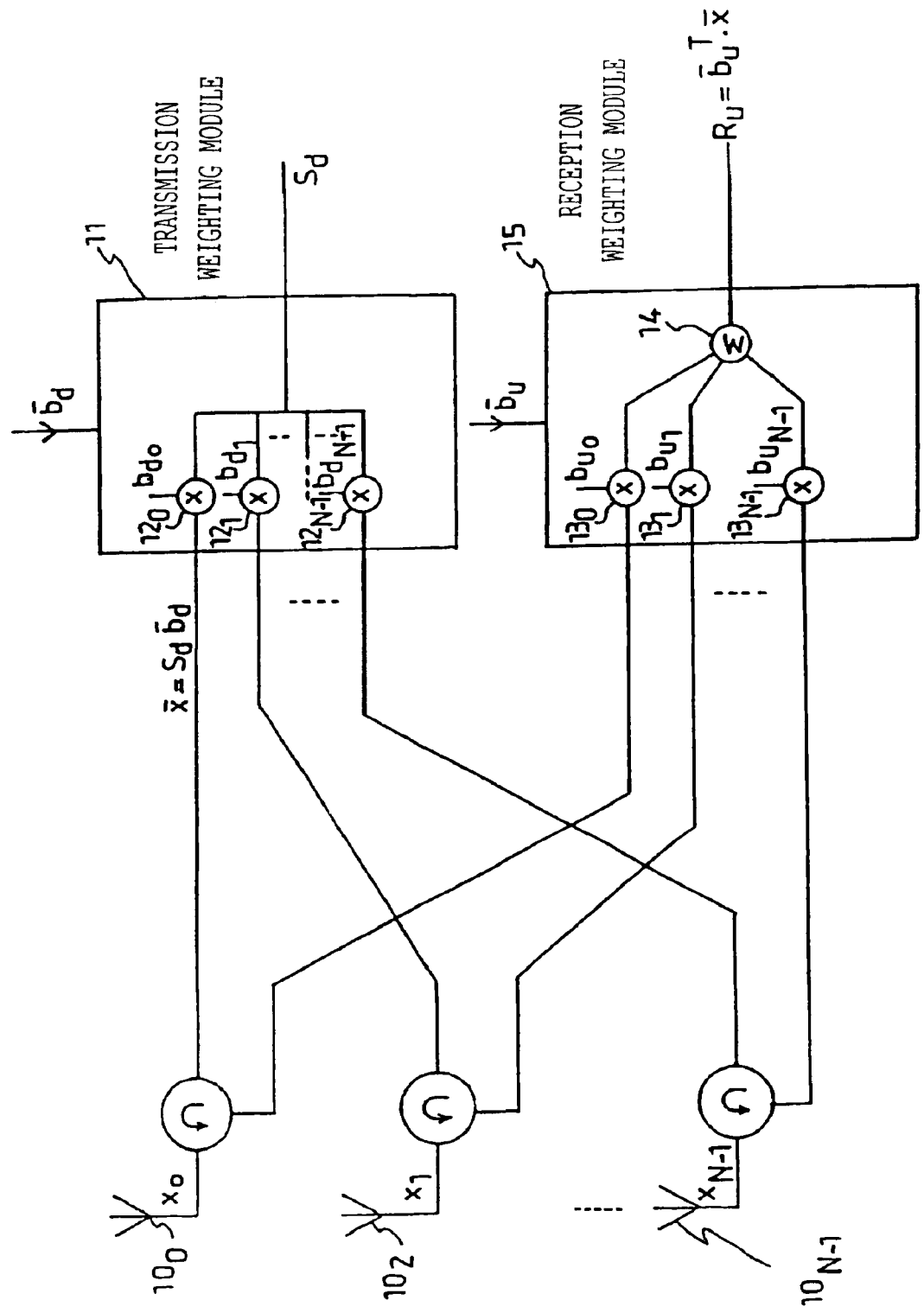
FIG. 1 depicts schematically a known device for obtaining an antenna gain function.

A first general idea at the basis of the invention is to sample the transmission and reception gain functions in order to construct transmission and reception gain vectors. As will be shown, optimum weighting vectors, in terms of ratio of signal to noise plus interference, can then be obtained from transmission and reception gain vectors according to matrix equations.

A second general idea at the basis of the invention is to obtain a transmission weighting vector, optimum in terms of ratio of signal to noise plus interference obtained, according to the reception gain weighting vector assumed itself to be optimum.

A third general idea at the basis of the invention is to estimate the downlink channel from variations in the uplink channel.

It will shown first of all that the weighting vectors can be obtained from a series of samples of the corresponding gain function.

Consider first of all a linear uniform array, formed by N antennae spaced apart by a pitch d and operating at the frequency f. The antennae gain function $G_0(\theta)$, obtained in the absence of any weighting (that is to say with $\overline{b}_0=(1,1,\ldots,1)^T$):

$$|G_0(\theta)| = \frac{\sin(N\varphi/2)}{\sin(\varphi/2)} \text{ with } \varphi = 2\pi f d/c \cdot \sin\theta \qquad (6)$$

This function has zeros for the values $\phi_k=2k\pi/N$, k a non-zero integer such that $\phi_k \in [-\pi,\pi[$, that is to say in the directions for which $\sin\theta_k=k \cdot c/Nfd$, when this expression has a direction. The phase difference between two consecutive zeros in the gain diagram is constant and is equal to $\Delta\phi=2\pi/N$. The angular difference between two consecutive zeros of the diagram varies in terms of Arcsin., a function whose derivative is increasing on [−1,1] and is therefore minimum for the angular difference between the first and second zeros. It is therefore bounded by $\Delta\theta_{min}=c/Nfd$ if N is sufficiently great. It will be assumed that the frequencies used are less than $f_0$ where $f_0$ is the natural frequency of the array. It can be concluded from this that the spectrum of the function $G_0(\theta)$ has a support bounded by $1/\Delta\theta_{min}=N/2$.

In more general terms, let $G(\theta)$ be the antenna gain function obtained by means of a weighting vector $\overline{b}$. G can be expressed as the Fourier transform (FT) (in reception) or the inverse Fourier transform (in transmission) of the complex weighting distribution of the antenna, namely:

$$b(x) = \sum_{i=0}^{N-1} b_i \cdot \delta(x - x_i)$$

with $x_i$=i.d; this gives: $G_u(\theta)=B(\sin\theta)$ with $$B(u) = \int_{-\infty}^{+\infty} b(x)\exp(-j2\pi ux/\lambda)dx$$

and likewise $G_d(\theta)=B'(\sin\theta)$ with $$B'(u) = \int_{-\infty}^{+\infty} b(x)\exp(j2\pi ux/\lambda)\,dx.$$

The function $b(x)$ being bounded by N.d, the difference between two zeros of the function B or B' is at least $\lambda/N.d$ and therefore all the more so $2/N$. Given the increase in the derivative of the function Arcsin, the minimum difference between two zeros of the function G is $2/N$. The function G therefore has a spectrum bounded by $N/2$.

According to the Shannon sampling theorem, it is concluded from this that it is possible to reconstitute the function $G(\theta)$ if sampling is carried out at a frequency greater than the Nyquist frequency, that is to say N. In other words, for an angular range $[-\pi/2,\pi/2]$, a minimum of $M>\pi.N$ samples are necessary, where M is an integer. In practice K.N samples can be taken with K integer, $K\geq 4$.

For a circular array, it can be shown that $1/\Delta\theta_{min}=N$ and the angular range being $[-\pi,\pi]$, M ($M>\pi.N$ and M integer) angularly equidistributed samples also suffice to reconstitute the function $G(\theta)$.

In the general case of the sampling of any gain function $G(\theta)$, it is necessary first to filter $G(\theta)$ by means of an anti-aliasing filter before sampling it. It then suffices to take M samples of the diagram filtered over the entire angular range in order to reconstitute the filtered diagram.

The samples of a gain function, possibly filtered by anti-aliasing filtering, if necessary, will be denoted $g_k$, $k=0,\ldots,M-1$ that is to say $g_k=G'(\theta_k)$ where the instances of $\theta_k$ are M angles equidistributed over $[-\pi/2,\pi/2]$ or $[-\pi,\pi]$ and where it is assumed that $G'$ was the filtered version of the reference complex diagram.

It is now possible to define a linear application, $h_s^f$ of $C^N$ in $C^M$ which makes the vector $h_s^f(\overline{b})=\overline{G}=(g_0,g_1,\ldots,g_{M-1})^T$ where $g_k=G(\overline{b},\theta_k)$ correspond to any weighting vector $\overline{b}$. The image of $C^N$ by $h_s^f$, is a vector sub-space of $C^M$ with a dimension at most equal to N, which will be denoted $\text{Im}_f$. If a base of $C^N$ is chosen, for example the canonical base, and a base of $C^M$, it is possible to express the linear application $h_s^f$ by a matrix $H_f$ of size M×N which is at most of rank N.

Let $\overline{G}$ be any gain vector corresponding to a sampled gain function. Seek the vector $\overline{b}$ such that $h_s^f(\overline{b})$ is as close as possible to $\overline{G}$ in the sense of a certain metric. There will be taken as a norm the Euclidian norm on $C^M$, namely $$\|\overline{G}\|^2 = \sum_{k=0}^{M-1} |g_k|^2.$$

If it exists, the sought-for vector $\overline{b}$ is then such that $h_s^f(\overline{b})=\overline{G}_p$ where $\overline{G}_p$ is the orthogonal projection of the vector $\overline{G}$ onto $\text{Im}_f$. If the matrix $H_f$ is of rank N, the sought-for vector $\overline{b}$ exists and can be written:

$$\overline{b} = H_f^+ \cdot \overline{G} \tag{7}$$

where $H_f^+ = (H_f^{*T} \cdot H_f)^{-1} \cdot H_f^{*T}$ is the pseudo-inverse matrix of the matrix $H_f$ with $H_f^{*T}$ a conjugate transpose of the matrix $H_f$.

In order to express the matrix $H_f$, it is necessary to agree on a base of the starting space and a base of the arrival space. It is possible to choose as the base of $C^M$ the canonical base and as a base of $C^N$ a base adapted to the description of the flat waves of frequency f. Consider the distinct vectors $\overline{e}_k$, $k=0,\ldots,N-1$, such that $\overline{e}_k=(e_{k,0},e_{k,1},\ldots,e_{k,N-1})^T$ with $$e_{k,i} = \exp\left(j \cdot \frac{2\pi f d}{c} \cdot i \cdot \sin\theta_k\right) = \exp(j\pi \cdot \eta \cdot i \cdot \sin\theta_k)$$

with $\eta=f/f_0$ and where the instances of $\theta_k$ belong to the interval $[-\pi/2,\pi/2]$. The vectors $\overline{e}_k$ are the weighting vectors of the array making it possible to form beams in the directions $\theta_k$. The vectors $\overline{e}_k$ form a base if the determinant of the coordinates of the instances of $\overline{e}_k$ in the canonical base of $C^N$ is non-zero. This determinant is a Vandermonde determinant which is equal to $$\prod_{p\neq q}(\exp(j\varphi_p) - \exp(j\varphi_q))$$

with $\phi_k=\pi\eta\sin\theta_k$. This determinant is cancelled out if and only if there are two angles $\theta_p$ and $\theta_q$ such that $\sin\theta_p-\sin\theta_q=2/\eta$. In other words, for $\eta<1$ the N vectors $\overline{e}_k$ always form a base and for $\eta=1$ only the case $\theta_p=-\theta_q=\pi/2$ is excluded. The directions can, for example, be chosen so as to be equally distributed, that is to say such that $\theta_k=k\pi/N$ with $k=-(N-1)/2,\ldots,0,\ldots,(N-1)/2$. In this case, the matrix $H_f$ has as its components:

$$H_{pq} = \sum_{i=0}^{N-1} \exp(j\pi\eta \cdot i \cdot \sin(p\pi/N))\exp(-j\pi\eta \cdot i \cdot \sin(q\pi/M))$$

or:

$$H_{pq} = \sum_{i=0}^{N-1} \exp(j\pi\eta \cdot i \cdot [\sin(p\pi/N) - \sin(q\pi/M)]) = \tag{8}$$

$$\exp(j(N-1)\Psi_{pq}/2) \cdot \frac{\sin(N\Psi_{pq}/2)}{\sin(\Psi_{pq}/2)}$$

with $\Psi_{pq}=\pi\eta(\sin(p\pi/N)-\sin(q\pi/M))$.

Alternatively, it is possible to choose as a starting base another base adapted to the frequency f, the one formed by the vectors $\overline{e}'_k$, such that $e'_{k,i}=\exp(j\pi.\eta.i.\sin\theta_k)$ with $\sin\theta_k=2k/\eta N$ and $k=-(N-1)/2,\ldots,0,\ldots,(N-1)/2$. These vectors exist if $|\sin\theta_k|\leq 1, \forall k$, that is to say for $\eta>1-1/N$, and in this case the vectors $\overline{e}'_k$ form a base which has the advantage of being orthogonal.

Alternatively, it is possible to choose as the starting base the canonical base of $C^N$, which has the advantage of not depending on the frequency. In this case, the matrix $H'_f$ expressed in this base is written:

$$H'_f = H_f \cdot T^{-1} \tag{9}$$

where T is the matrix of the coordinates of $\overline{e}_k$ in the canonical base, that is to say $T_{pp'}=\exp(j\pi p \sin(p'/N))$. It was seen above that this matrix had a non-zero Vandermonde determinant and was consequently not reversible.

Assume now that it is sought to approximate a gain function obtained at a first frequency $f_1$, $f_1\leq f_0$ and denote the vector of the samples associated with this gain function $\overline{G}_1=h_s^{f_1}(\overline{b}_1)$. Let a second working frequency be $f_2$, $f_2\leq f_0$. $\overline{G}_1$ belonging to $C^M$, if the matrix $H_{f_2}$ is of rank N, it is possible to find a vector $\overline{b}_2$ such that $h_s^{f_2}(\overline{b}_2)$ is the projection of $h_s^{f_1}(\overline{b}_1)$ onto $\text{Im} f_2$. The vector $\overline{b}_2$ is obtained by means of the matrix equation:

$$\overline{b}_2 = H_{f_2}^+ \cdot H_{f_1} \overline{b}_1 \tag{10}$$

This equation makes it possible in particular to obtain, at a second working frequency, a sampled gain diagram which is as close as possible to the one, referred to as the reference, obtained at a first working frequency.

Equation (10) applies advantageously to the array of antennae of a base station in a mobile telecommunication system operating in FDD (Frequency Division Duplex) mode. In such a system, a frequency $f_d$ is used on the downlinks and a frequency $f_u$ distinct from $f_d$ is used on the uplinks. Equation (10) then makes it possible to directly obtain the weighting vector on transmission $\overline{b}_d$ from the weighting vector on reception $\overline{b}_u$.

$$\overline{b}_d = H_d^+ . H_u \overline{b}_d \tag{11}$$

where there has been noted: $H_d = H_{fd}$ and $H_u = H_{fu}$.

Equation (11) makes it possible, as has been seen, to obtain, at the transmission frequency $f_u$, a sampled gain diagram which is as close as possible to a reference diagram obtained at the reception frequency $f_d$. However, the interference profile, that is to say the angular distribution of the power of the interference, is not necessarily the same on the downlink channel as on the uplink channel. This is because the directions of the interfering sources are not necessarily identical in transmission and reception. Consequently, though the reception gain diagram is optimum for a reception interference profile, it will not necessarily be so for a transmission interference profile. As will be shown later, if the transmission and reception interference profiles differ, equation (11) must be modified in order to take account of this difference.

Figure 2:
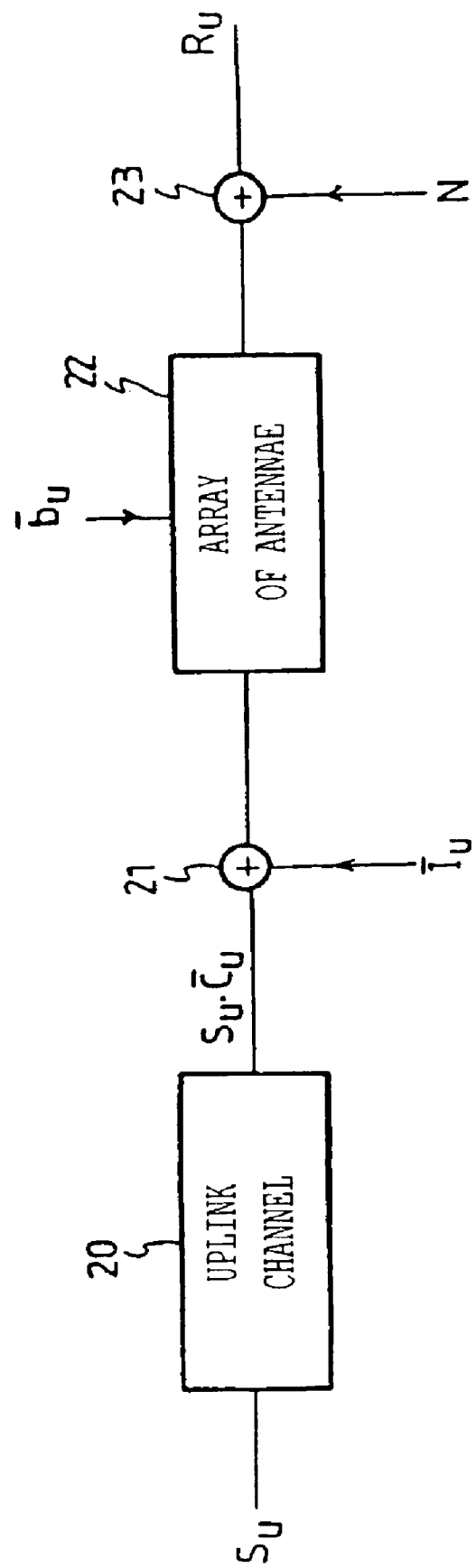
FIG. 2 depicts schematically an uplink transmission channel in a mobile telecommunication system.

FIG. 2 depicts the assembly consisting of the uplink channel (20), the array of antennae (22) and the reception weighting module (23). The effect of the noise has been represented by the addition (21) of a directional noise $\bar{I}_u$ due to the interfering signals, and at (24) an isotropic centred white Gaussian background noise N.

Just as the gain function can be represented by a gain vector, the channel can be modelled by a dimension vector M, defined as the angular sampling of the transfer function of the channel in the directions $\theta_k$, k=0, . . . , M−1 and denoted $\overline{C}_u = (c_{u0}, c_{u1}, \ldots, c_{uM-1})^T$. This vector has P amongst M non-zero coefficients, where P is the number of channel propagation paths. For these P coefficients $c_{uk}$, $c_{uk} = \alpha_{uk}.\exp{-j(2\pi f_u.L_{uk}/c + \phi_{uk})}$ where $L_{uk}$ is the length of the path concerned, $\alpha_{uk}$ the coefficient of attenuation of the signal propagating along the said path and $\phi_{uk}$ the polarisation of the incident signal.

The signal $R_u$ received by the base station can be written:

$$R_u = \overline{G}_u^T \cdot (S_u \cdot \overline{C}_u + \bar{I}_u) + N \tag{12}$$

where $\overline{G}_u$ is the reception gain vector and $S_u$ is the signal transmitted by the mobile terminal.

The ratio of signal to noise plus interference is:

$$(C/I+N)_u = \frac{E(|\overline{G}_u^T \cdot S_u \overline{C}_u|^2)}{E(|\overline{G}_u^T \cdot \bar{I}_u|^2) + E(|N|^2)} = \frac{P_u \cdot |\overline{G}_u^T \cdot \overline{C}_u|^2}{N_0 + I_u \cdot \sum_{k=0}^{M-1} \sigma_{uk}^2 |g_{uk}|^2} \tag{13}$$

where $P_u$ is the power of the signal $S_u$, $N_0$ is the power of the background noise and $\bar{I}_u = \sqrt{I_u} . \bar{I}_u^0$ where $\bar{I}_u^0$ is the standardised vector whose components are assimilated to standardised centred Gaussian random variables $N(0, \sigma_{uk}^2)$ that is to say such that $$\sum_{k=0}^{M-1} \sigma_{uk}^2 = 1$$

and where $I_u = E(\|\bar{I}_u\|^2)$ is the total power of the directional noise (that is to say of the interference on the uplink channel). It was assumed in (13) that the isotropic noise was independent of the directional noise.

Expression (13) can then be written:

$$(C/I+N)_u = \frac{P_u}{I_u} \cdot \frac{|\overline{\Lambda}_u^T \overline{\Omega}_u|^2}{\|\overline{\Lambda}_u\|^2} \tag{14}$$

where $\overline{\Omega}_u = D_u^{-1}.\overline{C}_u$, $\overline{\Lambda}_u = D_u \overline{G}_u$ and $D_u = \text{Diag}(\sqrt{\sigma_{uk}^2 + \gamma_u N_0/I_u})$ with $\gamma_u = 1/\|\overline{G}_u\|^2$. Expression (14) is maximal for $\overline{\Lambda}_u = \overline{\Omega}_u^*$ and therefore for:

$$\overline{G}_u = D_u^{-1} \overline{\Omega}_u^* = D_u^{-2} . \tilde{C}_u^* \tag{15}$$

The reception weighting vector, $\overline{b}_u$, optimum in the sense of the maximisation of the ratio of signal to noise plus interference on the channel, can then be expressed:

$$\overline{b}_u = H_u^+ . D_u^{-1} \overline{\Omega}_u^* = H_u^+ . D_u^{-2} \tilde{C}_u^* \tag{16}$$

Figure 3:
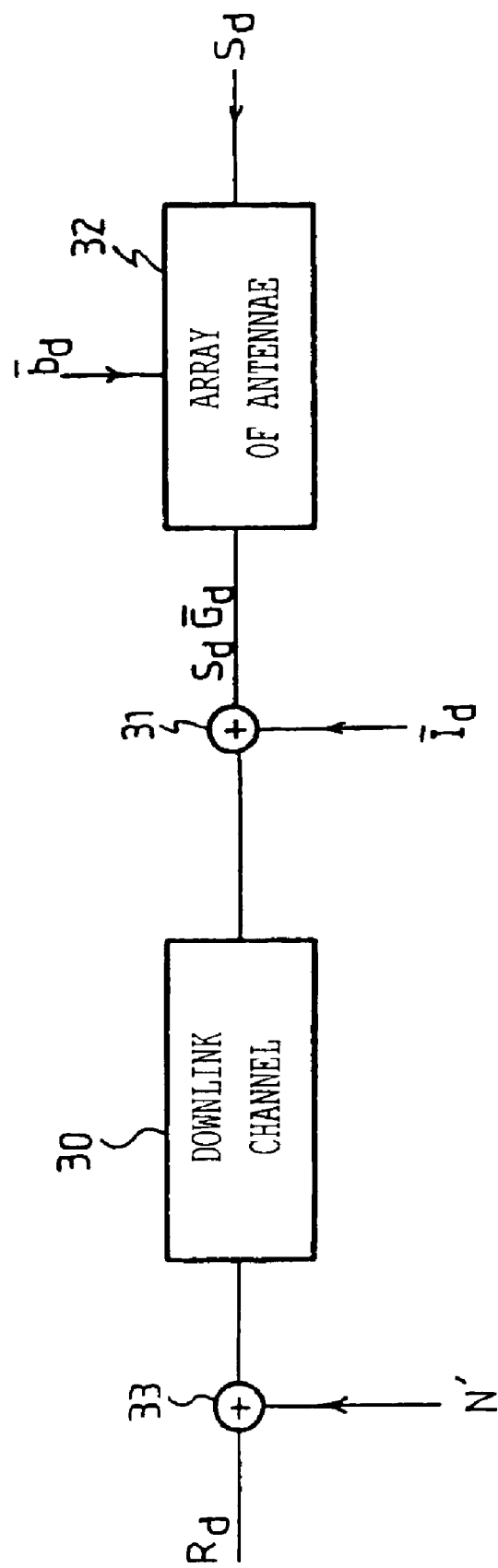
FIG. 3 depicts schematically a downlink transmission channel in a mobile telecommunication system.

FIG. 3 depicts the assembly consisting of the downlink channel (30), the array of antennae (32) and the transmission weighting module (33). The effect of the noise has been represented by the addition at (31) of a directional noise $\bar{I}_d$ due to the interfering signals and at (34) by a centred isotropic white Gaussian background noise N'.

Just like the uplink channel, the downlink channel can be modelled by a vector of dimension M, defined as the angular sampling of the transfer function of this channel in the directions $\theta_k$, k=0, . . . , M−1 and denoted $\overline{C}_d = (c_{d0}, c_{d1}, \ldots, c_{dM-1})^T$. This vector has P' from amongst M non-zero coefficients, where P' is the number of propagation paths of the channel. For these P' coefficients $c_{dk}$, $c_{dk} = \alpha_{dk}.\exp{-j(2\pi f_d.L_{dk}/c + \phi_{dk})}$ where $L_{dk}$ is the length of the path concerned, $\alpha_{dk}$ the coefficient of attenuation of the signal propagating on the said path and $\phi_{dk}$ the polarisation of the incident signal.

The signal $R_d$ received by the mobile terminal can be written:

$$R_d = \overline{C}_d^T \cdot (S_d \cdot \overline{G}_d + \bar{I}_d) + N' \tag{17}$$

where $\overline{G}_d$ is the transmission gain vector and $S_d$ is the signal transmitted by the base station.

The ratio of signal to noise plus interference is:

$$(C/I+N)_d = \frac{E(|\overline{C}_d^T \cdot S_d \overline{G}_d|^2)}{E(|\overline{C}_d^T \cdot \bar{I}_d|^2) + E(|N'|^2)} = \frac{P_d \cdot |\overline{C}_d^T \cdot \overline{G}_d|^2}{N_0' + I_d \cdot \sum_{k=0}^{M-1} \sigma_{dk}^2 |Cdk|^2} \tag{18}$$

where $P_d$ is the power of the signal $S_d$, and $N_0'$ is the power of the background noise, and where $\bar{I}_d = \sqrt{I_d} . \bar{I}_d^0$ where $\bar{I}_d^0$ is the standardised vector whose components are assimilated to standardised centred random Gaussian variables $N(0, \sigma_{dk}^2)$, that is to say such that $$\sum_{k=0}^{M-1} \sigma_{dk}^2 = 1$$

and where $I_d = E(\|\bar{I}_d\|^2)$ is the total power of the directional noise (that is to say of the interference on the downlink channel). It was assumed in (18) that the isotropic noise was independent of the directional noise.

Expression (18) can also be written:

$$(C/I+N)_d = \frac{P_d}{I_d} \cdot \frac{|\bar{\Lambda}_d^T \bar{\Omega}_d|^2}{\|\bar{\Lambda}_d\|^2} \quad (19)$$

where $\bar{\Omega}_d = D_d^{-1} \cdot \bar{G}_d$, $\bar{\Lambda}_d = D_d \bar{C}_d$ and $D_d = \text{Diag}(\sqrt{\sigma_{dk}^2 + \gamma_d N'_0/I_d})$ with $\gamma_d = 1/\|\bar{C}_d\|^2$. Expression (19) is maximum for $\bar{\Omega}_d = \bar{\Lambda}_d^*$ and therefore for $$\bar{G}_d = D_d \bar{\Lambda}_d^* = D_d^2 \bar{C}_d^* \quad (20)$$

The transmission weighting vector, $\bar{b}_d$, optimum in the sense of the maximisation of the ratio of signal to noise plus interference on the downlink channel, can then be expressed as:

$$\bar{b}_d = H_d^+ \cdot D_d \bar{\Lambda}_d^* = H_d^+ \cdot D_d^2 \bar{C}_d^* \quad (21)$$

If it is assumed that the transfer function of the downlink channel is identical to that of the uplink channel, that is to say if $\bar{C}_d = \bar{C}_u$, it is possible to derive from (16) and (21) the relationship between the optimum weighting vectors $\bar{b}_d$ and $\bar{b}_u$:

$$\bar{b}_d = H_d^+ \cdot D_d^2 \cdot D_u^2 \cdot H_u \cdot \bar{b}_u \quad (22)$$

It should be noted that equation (11) is a particular case of equation (22) when $D_d = D_u^{-1}$. This will be the case in particular if the noise on the uplink channel and the noise on the downlink channel consist solely of isotropic noise.

The matrix $D_u$ can be estimated at the base station from a measurement of the noise power and the interference in the directions $\theta_k$, for example during a period of silence of the mobile terminal. On the other hand the matrix $D_d$ cannot be estimated as simply.

Let it be stated that $D_d = \text{Diag}(\sqrt{\sigma_{dk}^2 + \gamma_d N'_0/I_d})$ with $\gamma_d = 1/\|\bar{C}_d\|^2$ (23)

$\gamma_d$ can be estimated by the mobile terminal and transmitted over the uplink channel to the base station. Since $\gamma_d$ changes only slowly over time, the quantity of information to be transmitted relating to this parameter will be small.

Advantageously, it will be assumed that the power transfer coefficient does not depend on the frequency and is identical for the downlink channel and the uplink channel, namely $\|\bar{C}_d\|^2 = \|\bar{C}_u\|^2 = 1/\Gamma$. This assumption will in particular be verified if $\bar{C}_d = \bar{C}_u$. The value of $\Gamma$ can then be estimated directly by the base station, for example at the power control loop.

It is also possible to estimate the power of the interference in the direction $\theta_k$, that is to say $I_d \cdot \sigma_{dk}^2$, by expressing the fact that it is due to the transmission in the direction k of signals intended for mobile terminals $TS_j$ other than the one considered, that is to say $TS_{j0}$. Because of the overlap of the transmission gain diagrams for the signals intended for the mobile terminals $TS_j$ on the one hand and the mobile terminal $TS_{j0}$ on the other hand and the lack of orthogonality between these signals, the interference power attributable to the mobile terminals $TS_j$ in the direction $\theta_k$ can be written:

$$I_d(j_0) \cdot \sigma_{dk}^2(j_0) = \beta_d(j_0) \cdot \sum_{j \neq j_0} |S_d(j)|^2 \cdot |g_{dk}(j)|^2 \quad (24)$$

where the indices between parentheses have been added so as to distinguish the quantities relating to the different downlink channels (that is to say intended for the different mobile terminals) and where:

$\beta_d(j_0)$ is the coefficient of orthogonality of the downlink channel, destined for $TS_{j0}$;

$S_d(j)$ is the power of the transmission signal destined for the terminal $TS_j$;

$g_{dk}(j)$ is the kth coefficient of the gain vector $\bar{G}_d(j)$ relating to the transmission to $TS_j$.

If it is assumed that the coefficient of orthogonality of the downlink channel, $\beta_d(j_0)$, is little different from that of the uplink channel, $\beta_u(j_0)$, the above three quantities are available at the base station without a return of information by the mobile terminal being necessary. As seen above, the power transfer coefficient, $\gamma_d(j_0)$, is transmitted to the base station on the uplink channel from $TS_{j0}$ or directly estimated by the latter. It is therefore possible to obtain the matrix $D_d$ for a slight additional cost in terms of conveyance resources.

The only quantity in equation (24) liable to vary rapidly over time is the power of the transmission signals $S_d(j)$. In the case of a transmission in DS-CDMA mode, it will for example be possible to update these power values at each transmission slot.

Equation (22) was obtained by assuming $\bar{C}_d = \bar{C}_u$. This equation is not in general satisfied, notably because of the fact that the frequency used on the downlink channel is different from that used on the uplink channel. As a result the vector $\bar{b}_d$ calculated by means of equation (22) does not maximise the ratio of signal to noise plus interference, on reception by the mobile terminal.

The method according to the present invention proposes to calculate the optimum vector $\bar{b}_d$ from equation (21) and an estimation of the downlink channel, that is to say of the vector $\bar{C}_d$. It should be stated that the vectors $\bar{C}_u = (c_{u0}, c_{u1}, \ldots, c_{uM-1})^T$ and $\bar{C}_d = (c_{d0}, c_{d1}, \ldots, c_{dM-1})^T$ consist of the transfer functions of the respectively uplink and downlink channels, sampled in the directions $\theta_k$, $k = 0, \ldots, M-1$. The vector $\bar{C}_u$ has non-zero components in the directions where the uplink channel has propagation paths. More precisely, if a propagation path exists in the direction $\theta_k$, $c_{uk} = \alpha_{uk} \cdot \exp{-j(2\pi f_u \cdot L_{uk}/c + \phi_{uk})}$ where $L_{uk}$ is the length of the path concerned, $\alpha_{uk}$ the coefficient of attenuation of the signal propagating along the said path, $\phi_{uk}$ is the polarisation of the incident signal and $c_{uk} = 0$ otherwise. Likewise, the vector $\bar{C}_d$ has non-zero components in the directions where the downlink channel has propagation paths. More precisely, if a propagation path exists in the direction $\theta_k$, $c_{dk} = \alpha_{dk} \cdot \exp{-j(2\pi f_d \cdot L_{dk}/c + \phi_{dk})}$ where $L_{dk}$ is the length of the path concerned, $\alpha_{dk}$ the coefficient of attenuation of the signal propagating along the said path, $\phi_{dk}$ is the polarisation of the incident signal and $c_{dk} = 0$ otherwise. In the remainder of the explanations it will be assumed that the propagation paths of the uplink channel and of the downlink channel are identical, or in other words that $L_{dk} = L_{uk}$.

The components of the vector $\bar{C}_u$, $c_{uk}$, can, for example, be determined, in a manner known per se, by means of pilot symbols transmitted by the mobile terminal. Advantageously, an estimation will be carried out of the coefficients of attenuation $\alpha_{uk}$ and of the directions of arrival of the paths conjointly, as described in the French patent application No. 00 11160 filed on 29, Aug. 2000 in the name of the applicant. The vector $\overline{C_u}$, relating to a given uplink channel, is first of all differentiated, or in other words the variation in the vector $\overline{C_u}$ during the interval of time $\Delta t$ separating two consecutive estimations is evaluated. The variation in this vector can be written $\overline{\Delta C_u} = (\Delta c_{u0}, \Delta c_{u1}, \ldots, \Delta c_{uM-1})^T$ where $$\Delta c_{uk} \approx -j \cdot (2\pi f_u L_{uk}/c) \cdot c_{uk} \cdot \frac{\partial L_{uk}}{\partial t} \Delta t \qquad (25)$$

assuming that the coefficients of attenuation, $\alpha_{uk}$, of the different paths vary little in the course of the interval of time $\Delta t$. The vector $\overline{\Delta c_u}$ is next multiplied by the matrix M=Diag $(f_d/f_u \cdot 1/c_{uk})$. The vector thus obtained, denoted $\overline{\Delta_d} = (\delta_0, \delta_1, \ldots, \delta_{M-1})$ is then used for integrating the components of the vector $\overline{C_d}$ by virtue of the recurrence formula:

$$c_{dk}(t+\Delta t) = c_{dk}(t)(1+\delta_k(t) \cdot \Delta t) \qquad (26)$$

The initialisation of the calculation is effected by means of a vector $\overline{C_d}(0)$ of components $c_{dk}(0)$. These components are estimated by the mobile terminal by means of pilot symbols transmitted by the base station in the different directions $\theta_k$. The components are estimated periodically by the mobile terminal and transmitted, via the uplink channel, to the base station. At each new estimation, the integration calculation is reinitialised with the new components transmitted.

The vector $\overline{C_d}$ having been estimated by (26), the optimum weighting vector on transmission is then obtained by means of equation (21) in which the noise power matrix $D_d$ is estimated by means of (23) and (24).

Figure 4:
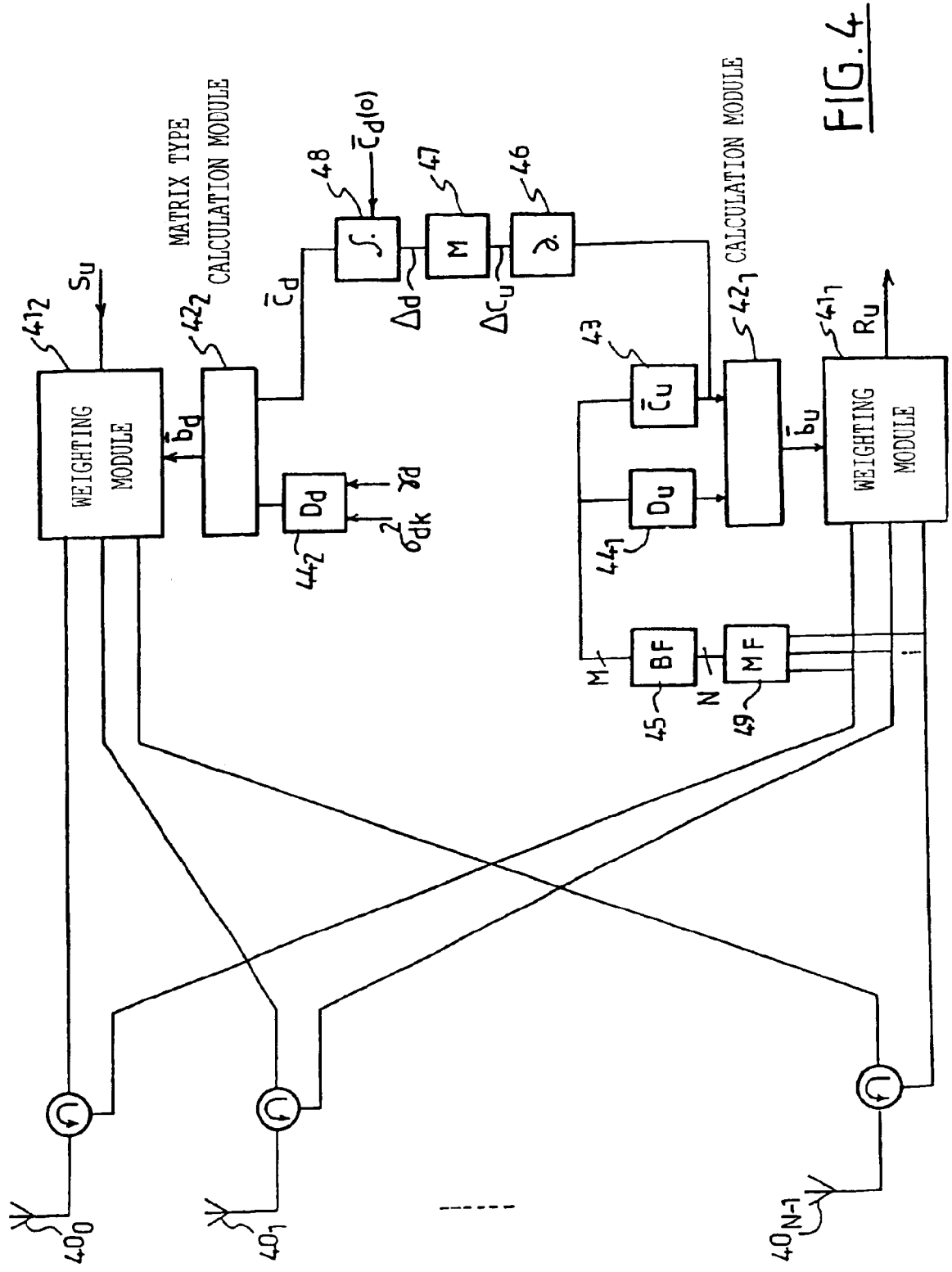
FIG. 4 depicts schematically a device for obtaining an antenna gain function according to one embodiment of the invention.

FIG. 4 illustrates an example of a device according to one embodiment of the invention. For reasons of simplicity, the processing of only one communication with a mobile terminal has been shown. The device, installed at the base station, comprises an array of antennae $(40_0), (40_1), \ldots (40_{N-1})$ coupled by means of duplexers to a first weighting module $(41_1)$ on reception, weighting the signals received by the different antennae by means of a first weighting vector, $\overline{b_u}$, and a second weighting module $(41_2)$ on transmission, weighting a signal to be transmitted by a second weighting vector, $\overline{b_d}$. When the device manages several communications with a plurality of mobile terminals, other weighting modules identical to the modules $(41_1), (41_2)$ must be provided in parallel with the latter. The signals received by the different antennae are demultiplexed according to the different users (that is to say the different mobile terminals). If the telecommunication system is a system of the DS-CDMA type, the demultiplexing will be carried out for example by means of a battery of filters adapted to the signatures of the different users, denoted (49). The N outputs of adapted filters are directed to a channel former (45), forming M beams in the directions $\theta_k$, k=0, ..., M-1. The M signals are transmitted to a module $(44_1)$ for evaluating the noise power matrix $D_u$ and to a module (43) for estimating the (uplink) channel $\overline{C_u}$. Advantageously, the vector $\overline{C_u}$ is estimated by means of pilot symbols transmitted by the mobile terminal. Advantageously, the noise power matrix $D_u$ is estimated during periods of silence of the mobile terminal. The matrix $D_u$ and the vector $\overline{C_u}$ are supplied to a module $(42_1)$ which calculates the vector $\overline{b_u}$ according to equation (16) and transmits it to the weighting module $(41_1)$. The vector $\overline{C_u}$ is then differentiated by a differentiating filter (46). The resulting vector $\overline{\Delta C_u}$ is multiplied at (47) by the matrix M in order to give the vector $\overline{\Delta_d}$. This vector then servers for integrating the vector $\overline{C_d}$ in the integrator (48). This integrator is regularly initialised by the estimations of the downlink channel transmitted by the mobile terminal, denoted $\overline{C_d}(0)$. The vector $\overline{C_d}$ is transmitted to the matrix-type calculation module $(42_2)$. This module also receives from $(44_2)$ the noise power matrix $D_d$. This matrix is evaluated in $(44_2)$ by means of equation (23). To do this, the module $(44_2)$ receives an estimation of the coupling coefficient, $\gamma_d$ or $\Gamma$ according to circumstances, of the interference powers $\sigma_{dk}^2$ in the directions $\theta_k$ as well as the total power $I_d$. The values $\sigma_{dk}^2$ are advantageously calculated from equation (24) using the values of the transmission signals, $S_d(j)$, $j \neq j_0$, intended for the mobile terminals other than the one in question $(j_0)$ and the gain vectors, $\overline{G_d}(j)$, $j \neq j_0$, which are associated with them. The module $(42_2)$ effects the calculation of the vector $\overline{b_d}$ in accordance with equation (21) and transmits it to the weighting module $(41_2)$.

Although the device described above has been depicted schematically in the form of functional modules, it goes without saying, however, that the various functions executed may be executed by virtue of a processor programmed for this purpose or by a plurality of dedicated processors.

What is claimed is:

1. Method for obtaining a transmission gain function for an array of antennae, comprising the steps of:
    weighting a signal to be transmitted with the array of antennae by a transmission weighting vector $\overline{b_d}$ with N complex coefficients, wherein N is a number of antennae in the array of antennae;
    transmitting from the array of antennae to a telecommunication terminal over a downlink channel a downlink transmission signal $S_d$, wherein the downlink channel is disturbed by at least one of an isotropic noise N' and a downlink interference $I_d$;
    transmitting from the telecommunication terminal to the array of antennae over an uplink channel an uplink transmission signal $S_u$; and
    determining the transmission weighting vector $\overline{b_d}$ by a matrix product from a noise power matrix $D_d$, wherein the noise power matrix $D_d$ is a function of a power of said isotropic noise N', a power of said downlink interference $I_d$ and a downlink channel vector $\overline{C_d}$, said downlink channel vector representing an angular sampling of a transfer function of the downlink channel in M directions k, k=0, ..., M-1, belonging to an angular range covered by the array of antennae.

2. Method for obtaining a transmission gain function according to claim 1, wherein said downlink channel vector $\overline{C_d}$ is obtained from variations in a transfer function of the uplink channel.

3. Method for obtaining a transmission gain function according to claim 2, wherein said downlink channel vector $\overline{C_d}$ is obtained from variations $\overline{\Delta C_u}$ in a uplink channel vector $\overline{C_u}$, said uplink channel vector represents an angular sampling of the transfer function of the uplink channel in said M directions.

4. Method for obtaining a transmission gain function according to claim 3, wherein variations $\overline{\Delta C_d}$ in the downlink channel vector $\overline{C_d}$ are obtained from the variations $\overline{\Delta C_u}$ in the uplink channel.

5. Method for obtaining a transmission gain function according to claim 4, wherein variations $\Delta c_{dk}$ components $c_{dk}$ of the downlink channel vector $\overline{C_d}$ are obtained by using variations $\Delta c_{uk}$ in components $c_{uk}$ of the uplink vector by an equation:

$$\Delta c_{dk}/c_{dk} = f_d/f_u \cdot \Delta c_{uk}/c_{uk},$$

wherein $f_u$ is a frequency used on said uplink channel and $f_d$ is a frequency used on said downlink channel.

6. Method for obtaining a transmission gain function according to claim 5, wherein said downlink channel vector $\overline{C}_d$ is obtained by integrating the variations $\overline{\Delta C}_d$ into said downlink channel vector $\overline{C}_d$ and an initial value $\overline{C}_d(0)$ is transmitted by the telecommunications terminal to said array of antennae.

7. Method for obtaining a transmission gain function according to claim 5, wherein the noise power matrix $D_d$ is further a diagonal matrix of a size M·M and with matrix components $$\sqrt{\sigma_{dk}^2 + \gamma_d N'_0/I_d},$$

wherein $\sigma_{dk}^2$ is a power of the downlink interference in the direction k, $N'_0$ is a power of the isotropic noise, $\gamma_d = 1/\|\overline{C}_d\|^2$ and $I_d$ is a total power of the downlink interference.

8. Method for obtaining a transmission gain function according to claim 5, wherein the array of antennae transmitting over a plurality of downlink channels a plurality of transmission signals to a plurality of telecommunication terminals and receiving from them a plurality of transmission signals transmitted over a plurality of uplink channels, wherein each downlink channel j relating to a terminal j of said plurality telecommunication terminals is associated with a transmission weighting vector $\overline{b}_d(j)$, a second noise matrix relating to the downlink channel j is a diagonal matrix of size M·M with matrix components $$\sqrt{\sigma_{dk}^2(j) + \gamma_d(j) \cdot N'_0/I_d(j)},$$

wherein $\sigma_{dk}^2(j)$ is a power of the downlink interference for the downlink channel j in the direction of k, $\gamma_d(j)$ is a coefficient representing a power transfer over the downlink channel j, $N'_0$ is a power of the second isotropic noise, and $I_d(j)$ is a total power of the downlink interference.

9. Method for obtaining a transmission gain function according to claim 5, wherein for a given downlink channel j, the downlink interference power in the direction k, $\sigma_{dk}^2(j)$, is estimated according to the power of the downlink transmission signals $S_d(j')$ on the downlink channels j' distinct from j, a coefficient $\beta_d(j)$ characterizing an orthogonality of the downlink channel j, the components $g_{dk}(j')$ of the gain vectors $\overline{G}_d(j')$ relating to said distinct downlink channels j' distinct from j, the gain vectors consisting of an angular sampling in said M directions of the transmission gain functions obtained for the distinct downlink channels j' distinct from j.

10. Transmission device for a base station in a mobile telecommunication system, comprising:
an array of N antennae,
weighting means for weighting a signal to be transmitted $S_d$ by said array of antennae with a transmission weighting vector $\overline{b}_d$ of N complex coefficients, wherein the weighting means comprises:
calculation means adapted to implement the method of obtaining the transmission gain function according to claim 5, said calculation means supplying to said weighting means the transmission weighting vector $\overline{b}_d$.

11. Method for obtaining a transmission gain function according to claim 4, wherein said downlink channel vector $\overline{C}_d$ is obtained by integrating the variations $\overline{\Delta C}_d$ into said downlink channel vector $\overline{C}_d$ and an initial value $\overline{C}_d(0)$ is transmitted by the telecommunications terminal to said array of antennae.

12. Method for obtaining a transmission gain function according to claim 3, wherein variations $\Delta c_{dk}$ in components $c_{dk}$ of the downlink channel vector $\overline{C}_d$ are obtained by using variations $\Delta c_{uk}$ in components $c_{uk}$ of the uplink vector by an equation:

$$\Delta c_{dk}/c_{dk} = f_d/f_u \cdot \Delta c_{uk}/c_{uk},$$

wherein $f_u$ is a frequency used on said uplink channel and $f_d$ is a frequency used on said downlink channel.

13. Method for obtaining a transmission gain function according to claim 2, wherein the noise power matrix $D_d$ is further a diagonal matrix of a size M·M and with matrix components $$\sqrt{\sigma_{dk}^2 + \gamma_d N'_0/I_d},$$

wherein $\sigma_{dk}^2$ is a power of the downlink interference in the direction k, $N'_0$ is a power of the isotropic noise, $\gamma_d = 1/\|\overline{C}_d\|^2$ and $I_d$ is a total power of the downlink interface.

14. Method for obtaining a transmission gain function according to claim 1, wherein the noise power matrix $D_d$ is further a diagonal matrix of a size M·M and with matrix components $$\sqrt{\sigma_{dk}^2 + \gamma_d N'_0/I_d},$$

wherein $\sigma_{dk}^2$ is a power o the downlink interference in the direction k, $N'_0$ is a power of the isotropic noise, $\gamma_d = 1/\|\overline{C}_d\|^2$ and $I_d$ is a total power of the downlink interference.

15. Method for obtaining a transmission gain function according to claim 1, wherein the array of antennae transmitting over a plurality of downlink channels a plurality of transmission signals to a plurality of telecommunication terminals and receiving from them a plurality of transmission signals transmitted over a plurality of uplink channels, wherein each downlink channel j elating to a terminal j of said plurality telecommunication terminals is associated with a transmission weighting vector $\overline{b}_d(j)$, a second noise matrix relating to the downlink channel j is a diagonal matrix of size M·M with matrix components $$\sqrt{\sigma_{dk}^2(j) + \gamma_d(j) \cdot N'_0/I_d(j)},$$

wherein $\sigma_{dk}^2(j)$ is a power of the downlink interference for the downlink channel j in the direction of k, $\gamma_d(j)$ is a coefficient representing a power transfer over the downlink channel j, $N'_0$ is a power of the second isotropic noise, and $I_d(j)$ is a total power of the downlink interference.

16. Method or obtaining a transmission gain function according to claim 15, wherein the coefficient $\gamma_d(j)$ is transmitted to the array of antennae by the terminal j on the corresponding uplink channel.

17. Method for obtaining a transmission gain function according to claim 15, wherein the coefficient $\gamma_d(j)$ is estimated by a base station from a coefficient $\Gamma$ characterizing the power transfer in the uplink direction.

18. Method for obtaining a transmission gain function according to claim 15, wherein for a given downlink channel j, the downlink interference power in the direction k, $\sigma_{dk}^2(j)$, is estimated according to the power of the downlink transmission signals $S_d(j')$ on the downlink channels j' distinct from j, a coefficient $\beta_d(j)$ characterizing an orthogonality of the downlink channel j, the components $g_{dk}(j')$ of the gain vectors $\overline{G}_d(j')$ relating to said distinct downlink channels j' distinct from j, the gain vectors consisting of an angular sampling in said M directions of the transmission gain functions obtained for the distinct downlink channels j' distinct from j.

19. Method for obtaining a transmission gain function according to claim 18, wherein the coefficient $\beta_d(j)$ is estimated from a coefficient characterizing the orthogonality of the uplink channel j.

20. Transmission device for a base station in a mobile telecommunication system, comprising:

an array of N antennae, weighting means for weighting the signal to be transmitted $S_d$ by said array of antennae with a transmission weighting vector $\overline{b}_d$ of N complex coefficients, wherein the weighting means comprises calculation means adapted to implement the method of obtaining the transmission gain function according to claim 1, said calculation means supplying to said weighting means said transmission weighting vector $\overline{b}_d$.

\* \* \* \* \*